(12) United States Patent
Vahala et al.

(10) Patent No.: US 8,818,146 B2
(45) Date of Patent: Aug. 26, 2014

(54) SILICA-ON-SILICON WAVEGUIDES AND RELATED FABRICATION METHODS

(75) Inventors: Kerry Vahala, Pasadena, CA (US); Hansuek Lee, Pasadena, CA (US); Tong Chen, Pasadena, CA (US); Jiang Li, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 308 days.

(21) Appl. No.: 13/494,707

(22) Filed: Jun. 12, 2012

(65) Prior Publication Data

US 2012/0321245 A1 Dec. 20, 2012

Related U.S. Application Data

(60) Provisional application No. 61/496,440, filed on Jun. 13, 2011.

(51) Int. Cl.
| | |
|---|---|
| G02B 6/12 | (2006.01) |
| G02B 6/10 | (2006.01) |
| H01L 21/00 | (2006.01) |
| H01L 21/302 | (2006.01) |
| H01L 21/461 | (2006.01) |
| G02B 6/136 | (2006.01) |

(52) U.S. Cl.
CPC ...................................... *G02B 6/136* (2013.01)
USPC ................ 385/14; 385/129; 438/40; 438/43; 438/713

(58) Field of Classification Search
CPC ... H01L 21/308; G02B 6/136; G02B 6/12002
USPC ........... 385/14, 129–131; 438/39, 40, 42, 43, 438/713

See application file for complete search history.

(56) References Cited

U.S. PATENT DOCUMENTS

| | | | |
|---|---|---|---|
| 4,461,672 A * | 7/1984 | Musser | 438/479 |
| 4,938,841 A * | 7/1990 | Shahar et al. | 438/701 |
| 5,872,022 A * | 2/1999 | Motoda et al. | 438/39 |
| 7,590,326 B2 * | 9/2009 | Fincato et al. | 385/129 |
| 8,377,320 B2 * | 2/2013 | Wang et al. | 216/48 |

OTHER PUBLICATIONS

"Fabrication and coupling to planar high-Q silica disk microcavities," by Kippenberg et al, Applied Physics Letters, vol. 83, No. 4, pp. 797-799, 2003.*
"Archimedean spiral cavity ring resonators in silicon as ultra-compact optical comb filters" by Xu et al, Optics Express, vol. 18, No. 3, pp. 1937-1945, 2010.*
Li, J., et al., Characterization of a high coherence, Brillouin microcavity laser on silicon, Optics Express 2012, 20: pp. 1-11.
Li, J., et al., Low-Pump-Power, Low-Phase-Noise, and Microwave to Millimeter-Wave Repetition Rate Operation in Microcombs, Physical Review Letters 2012, 109: 233901-1-233901-5.

(Continued)

*Primary Examiner* — Charlie Peng
*Assistant Examiner* — Robert Tavlykaev
(74) *Attorney, Agent, or Firm* — Steinfl & Bruno LLP (57) ABSTRACT

A method of manufacturing a waveguide eliminates a prior art reflow step and introduces certain new steps that permit fabricating of an ultra-low loss waveguide element on a silicon chip. The ultra-low loss waveguide element may be adapted to fabricate a number of devices, including a wedge resonator and a ultra-low loss optical delay line having an extended waveguide length.

21 Claims, 7 Drawing Sheets

(56) References Cited

OTHER PUBLICATIONS

Lee, H., et al., Chemically etched ultrahigh-Q wedge-resonator on a silicon chip, Nature Photonics 2012, 6: 369-373.

Adar, R., et al., Less than 1 dB Per Meter Propagation Loss of Silica Waveguides Measured Using a Ring Resonator, J. Lightwave Tech. 1994, 12: 1369-1372.

Aoki, T., et al., Observation of strong coupling between one atom and a monolithic microresonator, Nature 2006, 443: 671-674.

Argawi, G., Mode-partition noise and intensity correlation in a two-mode semiconductor laser, Phys. Rev. A 1988, 37: 2488-2434.

Armani, D.K., et al., Ultra-high-Q toroid microcavity on a chip, Nature 2003, 421: 925-928.

Barwicz, T., et al., Three-Dimensional Analysis of Scattering Losses Due to Sidewall Roughness in Microphotonic Waveguides, J. Lightwave Tech. 2005, 23: 2719-2732.

Bauters, J., et al. Ultra-low-loss high-aspect-ratio $Si_3N_4$ waveguides, Optics Express 2011, 19: 3163-3164.

Braje, D., et al., Brillouin-Enhanced Hyperparametric Generation of an Optical Frequency Comb in a Monolithic Highly Nonlinear Fiber Cavity Pumped by a cw Laser, Phys. Rev. Letters 2009, PRL 102: 193902-1-193902-4.

Cai, M., et al., Observation of Critical Coupling in a Fiber Taper to a Silica-Microsphere Whispering-Gallery Mode System, Phys. Rev. Letters 2000, 85: 74-77.

Carmon, T., et al., Dynamical thermal behavior and thermal self-stability of microcavities, Optics Express 2004, 12: 4742-4750.

Ciminelli, C., et al., Three-dimensional modeling of scattering loss in InGaAsP/InP and silica-on-silicon bent waveguides, J. Europ. Opt. Society 2009, 4: 09015-1-09015-6.

Ciminelli, C., et al., Photonic technologies for angular velocity sensing, Adv. Opt. & Photo. 2010, 2: 370-404.

Del'Haye, P., et al., Optical frequency comb generation from a monolithic microresonator, Nature 2007, 450: 1214-1218.

Del'Haye, P., et al., Full Stabilization of a Microresonator-Based Optical Frequency Comb, Phys. Rev. Letters 2008, PRL 101: 053903-1-053903-4.

Del'Haye, P., et al., Frequency comb assisted diode laser spectroscopy for measurement of microcavity dispersion, Nature Photonics 2009, 3: 529-533.

Del'Haye, P., et al., Octave Spanning Tunable Frequency Comb from a Microresontaor, Phys. Rev. Letters 2011, PRL 107: 063901-1-063901-4.

Ferdous, F., et al., Spectral line-by-line pulse shaping of on-chip microresonator frequency combs, Nature Photonics 2011, 5: 770-776.

Fortier, T.M., et al., Generation of ultrastable microwaves via optical frequency division, Nature Photonics 2011, 5: 425-429.

Foster, M., et al., Silicon-based monolithic optical frequency comb source, Optics Express 2011, 19: 14233-14239.

Gorodetsky, M., et al., Fundamental thermal fluctuations in microspheres, J. Opt. Soc. Am. B 2004, 21: 697-705.

Grudinin, I., et al., Ultrahigh optical Q factors of crystalline resonators in the linear regime, Phys. Rev. Letters A 2006, 74: 063806-1-063806-9.

Grudinin, I., et al., On the fundamental limits of Q factor of crystalline dielectric resonators, Optics Express 2007, 15: 3390-3395.

Grudinin, I., et al., Generation of optical frequency combs with a $CaF_2$ resonator, Optics Letters 2009, 34: 878-880.

Grudinin, I., et al., Brillouin Lasing with a $CaF_2$ Whispering Gallery Mode Resonator, Phys. Rev. Letters 2009, PRL 102: 043902-1-043902-4.

Hansch, T.W., et al., Laser Frequency Stabilization by Polarization Spectroscopy of a Reflecting Reference Cavity, Optics Comm. 1980, 35: 441-444.

Ip, E., et al., Coherent detection in optical fiber systems, Optics Express 2008, 16: 753-821.

Illchenko, V.S., et al., Optical Resonators with Whispering-Gallery Modes—Part II: Applications, IEEE J. Selected Topics in Quna. Elec. 2006, 12: 15-32.

Johnson, A., et al., Chip-based frequency combs with sub-100 GHz repetition, Optics Letters 2012, 37: 875-877.

Karlsson, C., et al., All-fiber multifunction continuous-wave coherent laser radar at 1.55 μm for range, speed, vibration, and wind measurements, Applied Optics 2000, 39: 3716-31726.

Kasai, K., et al., 256-QAM (64 Gb/s) Coherent Optical Transmission Over 160 km With an Optical Bandwidth of 5.4 GHz, IEEE Phon. Tech. Letters 2010, 22: 185-187.

Kippenberg, T.J., et al., Kerr-Nonlinearity Optical Parametric Oscillation in an Ultrahigh-$Q$ Toroid Microcavity, Phys. Rev. Letters 2004, 93: 083904-1-083904-4.

Kippenberg, T.J., et al., Demonstration of an erbium-doped microdisk laser on a silicon chip, Phys. Rev. A 2006, 74: 051802(R)-1-051802(R).

Kippenberg, T.J, et al., Cavity Opto-Mechanics, Optics Express 2007, 15: 17172-17205.

Kippenberg, T.J, et al., Microresonator-Based Optical Frequency Combs, Science 2011, 332: 555-559.

Kippenberg, T.J, et al., Cavity Optomechanics: Back-Action at Mesoscale, Science 2008, 321: 1172-1176.

Levy, J., et al., CMOS-compatible multiple-wavelength oscillator for on-chip optical interconnects, Nature Photonics 2009, 4: 37-40.

Lu., T., et al., High sensitivity nanoparticle detection using optical microcavities, PNAS 2011, 108: 5976-5979.

Lee, H., et al., Ultra-high-Q wedge-resonator on a silicon chip, arXiv: 1112.2196v1 2011, pp. 1-5.

Matsko, A., et al., Optical Resonators with Whispering Gallery-Gallery Modes—Part I: Basics, IEEE J Selected Topics in Quna. Elec. 2006, 12: 3-14.

Matsko, A., et al., Whispering-gallery-mode resonators as frequency references. I. Fundamental limitations, J. Opt. Soc. Am. B 2007, 24: 1324-1335.

Okawachi, Y., et al., Tunable All-Optical Delays via Brillouin Slow Light in an Optical Fiber, Phys. Rev. Letters 2005, PRL 94: 153902-1-153902-4.

Okawachi, Y., et al., Octave-spanning frequency comb generation in a silicon nitride chip, Optics Letters 2011, 36: 3398-3400.

Okai, M., et a., Strained multiquantum-well corrugation-pitch-modulated distributed feedback laser with ultranarrow (3.6 kHz) spectral linewidth, Elec. Letters 1993, 29: 1696-+.

Pant, R., et al., Cavity enhanced stimulated Briollouin scattering in an optical chip for multiorder Stokes generation, Optics Letters 2011, 36: 3687-3689.

Papp S., et al., Spectral and temporal characterization of a fused-quartz-microresonator optical frequency comb, Phys. Rev. A 2011, 84: 053833-1-053833-7.

Payne, S., et al., A theoretical analysis of scattering loss from planar optical waveguides, Opt. and Quan. Elec. 1994, 26: 977-986.

Quinlan, F., et al., A 12.5 GHz-spaced optical frequency comb spanning >400 nm for near-infrared astronomical spectrograph calibration, Rev. Sci. Instr. 2010, 81: 063105-1-063105-9.

Rafac, R.J., et al., Sub-dekahertz Ultraviolet Spectroscopy of [199]Hg+, Phys. Rev. Letters 2000, 85: 2462-2465.

Razzari, L., et al., CMOS-compatible integrated optical hyper-parametric oscillator, Nat. Phon. 2009, 4: 41-45.

Savchenkov, A., et al., Low Threshold Optical Oscillations in a Whispering Gallery Mode $CaF_2$ Resonator, Phys. Rev. Letters 2004, PRL 93: 243905-1-243905-4.

Savchenkov, A., et al., Whispering-gallery-mode resonators as frequency references. II. Stabilization, J. Opt. Soc. Am. B 2007, 24: 2988-2997.

Savchenkov, A., et al., Optical resonators with ten million finesse, Optics Express 2007, 15: 6768-6773.

Savory, S., et al., Laser Linewidth Requirements for Optical DQPSK Systems, IEEE Photo. Tech. Letters 2004, 16: 930-932.

Schawlow, A.L., et al., Infrared and Optical Masers, Phys. Rev. 1958, 112: 1940-1949.

Schliesser, A., et al., Resolved-sideband cooling of a micromechanical oscillator, Nature Physics 2008, 4: 415-419.

Shi, J.W., et al., High-Speed, High-Responsivity, and High-Power Performance of Near-Ballistic Uni-Traveling-Carrier Photodiode at 1.55 μm Wavelength, IEEE Photo. Tech. Letters 2005, 17: 1929-1931.

(56) References Cited

OTHER PUBLICATIONS

Smith, S.P., et al., Narrow-linewidth stimulated Brillouin fiber laser and applications, Optics Letters 1991, 16: 393-395.

Spillane, S.M., et al., Ultralow-threshold Raman laser using a spherical dielectric microcavity, Nature 2002, 415: 621-623.

Spillane, S.M., et al., Ideality in a Fiber-Taper-Coupled Microresonator System for Application to Cavity Quantum Electrodynamics, Phys. Rev. Letters 2003, 91: 043902-1-043902-4.

Tien, M.C., et al., Ultra-high quality factor planar Si3N4 ring resonators on Si substrates, Optics Express 2011, 19: 13551-13556.

Tomes, M., et al., Photonic Micro-Electromechanical Systems Vibrating at X-band (11-GHz) Rates, Phys. Rev. Letters 2009, PRL 102: 113601-1-113601-4.

Yang, L., et al., A 4-Hz Fundamental Linewidth on-chip Microlaser, CLEO 2007, pp. 1-2.

Udem, Th., et al., Optical frequency metrology, Nature 2002, 416: 233-237.

Vahala, K., et al., Semiclassical Theory of Noise in Semiconductor Lasers—Part I, IEEE J. Quan. Elec. 1983, QE-19: 1096-1101.

Vahala, K., Optical microcavities, Nature 2003, 424: 839-846.

Veroony, D.W., et al., High-$Q$ measurements of fused-silica microspheres in the near infrared, Optics Express 1998, 23: 247-249.

Vollmer, F., et al., Whispering-gallery-mode biosensing: label-free detection down to single molecules, Nature Methods 2008, 5: 591-596.

Young, B.C., et al., Visible Lasers with Subhertz Linewidths, Phys. Rev. Letters 1999, 82: 3799-3802.

Zhu, Z., et al., Stored Light in an Optical Fiber via Stimulated Brillouin Scattering, Science 2007, 318: 1748-1750.

Zhu, Z., et al., Broadband SBS Slow Light in an Optical Fiber, J. Lightwave Tech. 2007, 25: 201-206.

Tkach, RW, et al., Spontaneous Brillouin Scattering for Single-Mode Optical-Fibre Characterisation, Elec. Letters 1986, 22: 1011-1013.

Li, J., et al., Chip-based Brillouin lasers as spectral purifiers for photonic systems, arXiv:1201.4212 2011, pp. 1-5.

Li, J., et al., Highly Coherent, Microcavity Brillouin Laser on Silicon, FIO/LS Tech. Digest 2011, pp. 1-2.

Anetsberger, G., et al., Ultralow-dissipation optomechanical resonators on a chip, Nature Photonics 2008, 2: 627-633.

Lu, T., et al., Frequency Noise of a Microchip Raman Laser, CLEO 2009, pp. 1-2.

Savchenkov, A., et al., Tunable Optical Frequency Comb with a Crystalline Whispering Gallery Mode Resonator, Phys. Rev. Letters 2008, PRL 101: 093902-1-093902-4.

Kominato, Extremely Low-loss (0.3 dB/m) and Long Silica-Based Waveguides with Large Widtth and Clothoid Curve Connection, ECOC Proceedings 2004, 2: pp. 1-2.

\* cited by examiner

SILICA-ON-SILICON WAVEGUIDES AND RELATED FABRICATION METHODS

CROSS REFERENCE TO RELATED APPLICATIONS

The present application claims priority to U.S. Provisional Patent Application No. 61/496,440 entitled "Ultra Low Loss Wedge Waveguide and Resonator on a Chip" filed on Jun. 13, 2011, which is incorporated herein by reference in its entirety. The present application may also be related to: i) U.S. Provisional Patent Application No. 61/498,442 entitled "Highly Coherent, Microcavity Brillouin Laser on Silicon" filed on Jun. 17, 2011, ii) U.S. Provisional Patent Application No. 61/498,444 entitled "Chip-Base Frequency Comb with Microwave Repetition Rate" filed on Jun. 17, 2011, and iii) U.S. Pat. No. 8,045,834, all of which are also incorporated herein by reference in their entirety.

STATEMENT OF GOVERNMENT GRANT

This invention was made with government support under HR0011-09-C-0122 awarded by DARPA. The government has certain rights in the invention.

FIELD

The present teachings relate to waveguides. In particular, the present teachings relate to waveguides having ultra-low optical loss as a result of improved fabrication techniques.

DESCRIPTION OF RELATED ART

Optical microcavities are finding application in an increasingly diverse set of subjects including, for example, cavity quantum electrodynamics, nonlinear optics, communications, frequency micro-combs and bio-detection [1, 2, 3, 4]. In most of these applications, cavity Q factor and overall form factor are considered significant, and efforts have therefore been directed towards realization of high-Q, chip-based devices. In this regard, microtoroid resonators have offered a unique combination of ultra-high-Q performance (Q>100 million) in an extremely compact, silicon-chip-based structure [5]. However, the silica reflow step that is required to fabricate these devices, presents limitations on precise control of device size and shape, as well as limitations on resonator placement near other photonic devices.

Optical microcavity techniques and technologies are also often used in fabricating certain types of photonic waveguides on silica chips. However, there is a multi-order-of-magnitude gap between photonic losses in optical fibers and in chip-based photonic waveguides. A significant portion of photonic loss in silica-based photonic waveguides may be attributed to process-induced surface roughness in these waveguides. It is therefore desirable to reduce this type of loss and some efforts [7] have been directed towards achieving this end. While these efforts have led to some progress [8, 9], further improvements are very desirable.

SUMMARY

According to a first aspect of the present disclosure, a method for fabricating a waveguide is provided. The method includes placing a silicon substrate in a furnace; introducing steam into the furnace; raising the temperature inside the furnace to a first temperature level wherein a silicon dioxide layer is formed on a major surface of the silicon substrate; eliminating a moisture content in the silicon substrate by heating the silicon substrate at a second temperature level in an oxygen-rich environment; forming a first assembly by applying a photo-resist layer upon a portion of the major surface of the silicon dioxide layer; immersing the first assembly into a bath containing an etching solution selected for etching silicon dioxide; forming a second assembly by allowing the etching solution to act upon the silicon dioxide layer of the first assembly for a first period of time that is selected in order to: a) expose a portion of the silicon substrate, and b) form a wedge structure in the silicon dioxide layer; forming a third assembly by extending the first period of time by a second period of time in order to eliminate a foot region formed upon a sloping surface of the wedge structure; after eliminating the foot region, forming a fourth assembly by removing the photo-resist layer from the third assembly; and forming a waveguide component from the fourth assembly by exposing the fourth assembly to a xenon difluoride ($XeF_2$) environment that eliminates a portion of the silicon substrate and forms a support pillar below the wedge structure.

According to a second aspect of the present disclosure, a waveguide is provided. The waveguide includes a wedge structure formed from a silicon dioxide layer, in part by eliminating a foot region, the wedge structure having a linear sloping surface with a linear slope angle ranging from >7 degrees to <90 degrees, the linear sloping surface characterized in part by the absence of the foot region.

Further aspects of the disclosure are shown in the specification, drawings and claims of the present application.

BRIEF DESCRIPTION OF THE DRAWINGS

Many aspects of the present disclosure can be better understood with reference to the following drawings. The components in the drawings are not necessarily drawn to scale. Instead, emphasis is placed upon clearly illustrating various principles. Moreover, in the drawings, like reference numerals designate corresponding parts throughout the several views.

DETAILED DESCRIPTION

Figure 1:
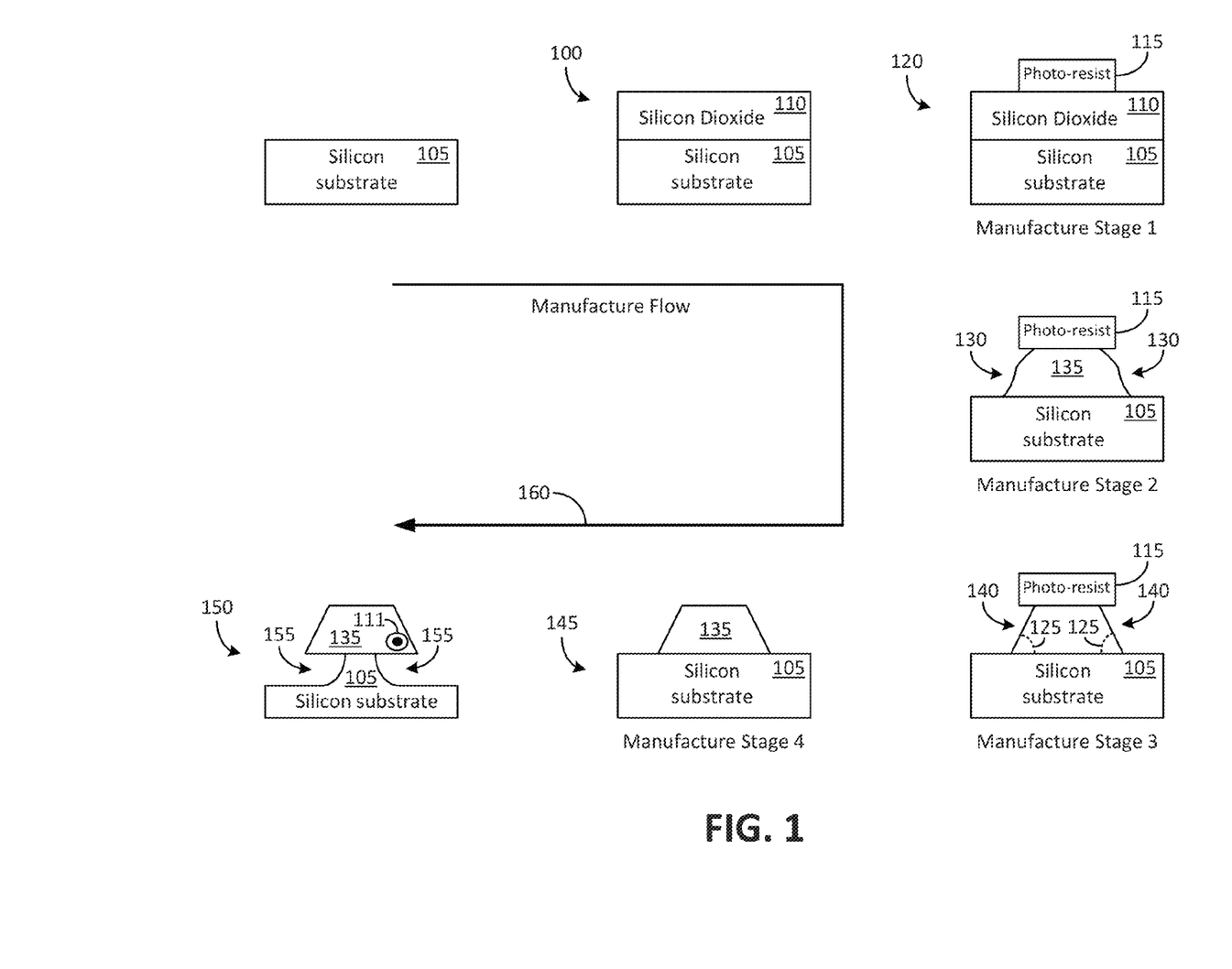
FIG. 1 shows a manufacture flow of a waveguide in accordance with one embodiment of the invention.

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as, for example, optical, photonic, silica, silicon and chip are used herein as a matter of convenience for description purposes and should not be interpreted literally in a narrowing sense. For example, optical propagation may be alternatively referred to herein as photonic propagation. A person of ordinary skill in the art will understand that these terms may be used interchangeably and as such must be interpreted accordingly. It will be also be understood that the drawings use certain symbols and interconnections that must be interpreted broadly as can be normally understood by persons of ordinary skill in the art. As one example, of such interpretation, the sloping surface on manufacturing stage 2 in FIG. 1 is shown to have a certain non-linear profile. However, one of ordinary skill in the art will understand that the sloping surface may have protrusions and/or indentations in various other shapes. Furthermore, the region referred to herein as a "foot region" does not necessarily imply a close resemblance to a foot, but is more generally intended to indicate a surface area that is not smooth and harmonious. As can be understood by one of ordinary skill in the art, such rough surfaces negatively impact light propagation (via scattering, reflection, absorption, dissipation etc).

Attention is now drawn to FIG. 1, which shows a few stages of manufacture of a waveguide 150 in accordance with one embodiment of the invention. The manufacture flow (indicated by arrow 160) begins with a silicon substrate 105. Silicon substrate 105, which for example, may be a 100 prime grade float zone silicon wafer, is placed in a furnace that is raised to a suitable temperature at which a top layer of the silicon substrate 105 turns into a silicon dioxide layer 110.

Significantly, during this heating process, steam is introduced into the furnace. In other words, silicon substrate 105 is subjected to heat in a humid atmosphere for forming silicon dioxide layer 110. While the water constituent is desirable at this stage of manufacture, it is desirable that any residual moisture in the product be eliminated subsequently.

Consequently, the water content is purged by placing assembly 100 in a furnace operating at 1000 degrees Celsius for approximately a 24 hour period. This drying out process contributes to a significant level of reliability in obtaining a desirably high Q factor in the manufactured product.

Figure 3:
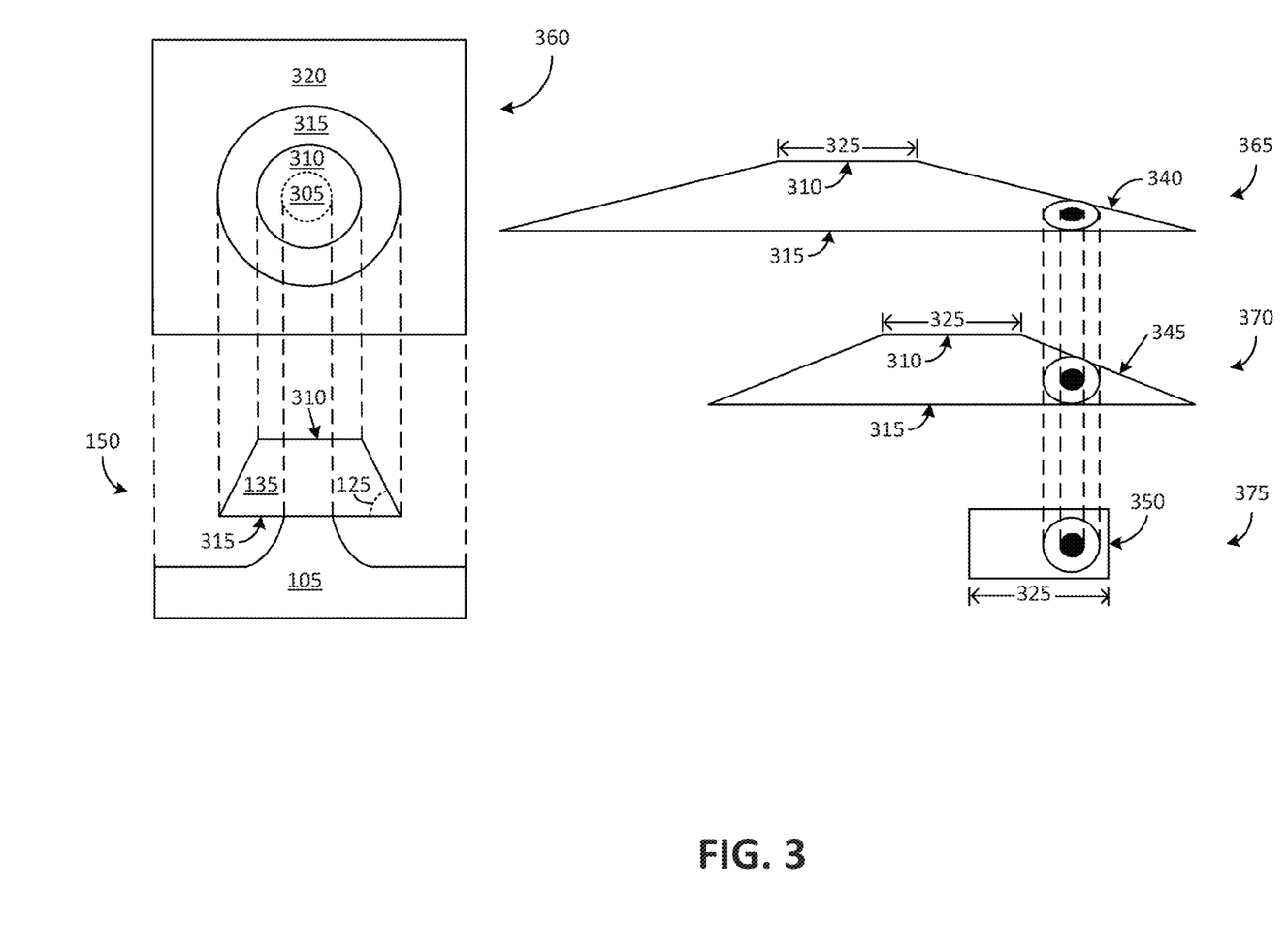
FIG. 3 shows several cross-sectional views of associated with a circular wedge resonator to illustrate the effects of slope angles on light propagation through a waveguide portion of the resonator.

In manufacture stage 1, an assembly 120 is formed by applying a photo-resist layer 115 upon silicon dioxide layer 110 in the form of a suitable pattern. Various patterns may be used. For example, a circular pattern may be used to obtain a waveguide such as one that is shown in FIG. 3. In one exemplary embodiment, the application of photo-resist layer 115 is patterned using a stepper on thermally grown silicon dioxide layer 115 having a thickness in the range of 2-10 microns.

In manufacture stage 2, assembly 120 is immersed in a suitable etchant, such as, for example, a buffered hydrofluoric acid solution. After immersion for a certain period of time, the etchant acts upon silicon dioxide layer 110 to not only expose a portion of the top surface of silicon substrate 105, but also to form a wedge structure 135 below photo-resist layer 115. In contrast to the exposed top surface of silicon substrate 105, which is relatively smooth, the sloping surface of the wedge structure 135 has a certain roughness as well as a deformity in the form of what is referred to herein as a "foot region" 130.

The surface roughness of wedge structure 135, as well as the presence of foot region 130, is undesirable because both these features create a negative impact on light propagated inside the wedge structure 135, more specifically on the Q factor of the finished product. As is known, the Q factor defines a photon storage time in a waveguide structure, with a higher Q indicating a larger storage time.

Consequently, manufacturing stage 2 is followed by manufacturing stage 3, wherein the period of time selected for manufacturing stage 2 is specifically extended in order to obtain a higher Q by eliminating foot region 130 and producing a smooth, linear surface having a desirable slope angle 125 in the wedge structure 135.

The desirable slope angle 125 ranges from about 7 degrees to about 90 degrees. Prior art solutions have expressly aimed at manufacturing and using angles below 27 degrees. However, such small angles do not provide satisfactory performance in terms of obtaining high Q values, and furthermore suffer from certain handicaps during manufacture as well as in product structure. One of the handicaps associated with prior art manufacturing is the need to include a reflow process in order to obtain high Q in a lossy foot wedge region. As for product structure, one of the handicaps pertains to a relatively large spacing requirement between two adjacent elements such as between a pair of waveguide channels. This spacing aspect may be better understood from additional description below.

Slope angle 125 may be empirically controlled in various ways. In one implementation, slope angle 125, as well as the surface roughness of the wedge structure 135, is controlled by selecting an appropriate adhesion factor incorporated into photoresist layer 115. The adhesion factor incorporated into photoresist layer 115 may be varied by using various types of adhesion promoters. In other words, for a given period of time, to obtain a larger slope angle, a promoter that provides higher adhesion may be used because such a promoter prevents fast penetration between the photoresist layer 115 and silicon dioxide layer 110.

In manufacture stage 4, photo-resist layer 115 is removed by employing a cleaning process, after which assembly 145 is exposed to a xenon difluoride ($XeF_2$) environment that etches a portion of silicon substrate 105 and forms a support pillar that supports wedge structure 135. The removal of the portion of silicon substrate 105 results in an undercut below wedge structure 135, the undercut serving to isolate light 111 propagating inside wedge structure 135 from coupling into silicon substrate 105. The undercut may be set to various values. For example, in one embodiment, the undercut is set to about 100 microns for a 1 mm diameter wedge structure, and in another embodiment, the undercut is set to over 150 microns for a 7.5 mm diameter wedge structure.

A resonator device fabricated upon a chip, and having a Q factor of about 875 million may be manufactured via the method of manufacture described above, wherein a disadvantageous prior art reflow step has been eliminated. This Q factor is achievable in an important size range of diameters greater than 500 microns. Such devices may be used for realizing microwave rate free-spectral-range in certain non-linear sources and also for rotation sensing. A resonator device fabricated using this method of manufacture not only provides a new benchmark for Q factor on a chip, but also provides, for the first time, full compatibility of this ultra-high Q device class with conventional semiconductor processing.

The method of manufacture described above may also be used to fabricate a wedge whispering-gallery-mode waveguide having the cross-sectional shape of wedge structure 135. Such a waveguide has an optical loss as low as 0.08 dB/m at 1550 nm wavelength, as a result of the obtained high Q factor.

The method of manufacture described above may be further used to fabricate delay lines. In one embodiment, a 7 meter long delay line is fabricated on a 5 cm×5 cm silicon wafer chip with an optical loss of approximately 0.08 dB/m. It is expected that this loss value can be further reduced to about 0.03 dB/m.

Furthermore, it will be understood that while the method described above described the creation of a silicon dioxide layer upon a silicon substrate, the method may be similarly applied using substrates other than silicon.

Figure 2A:
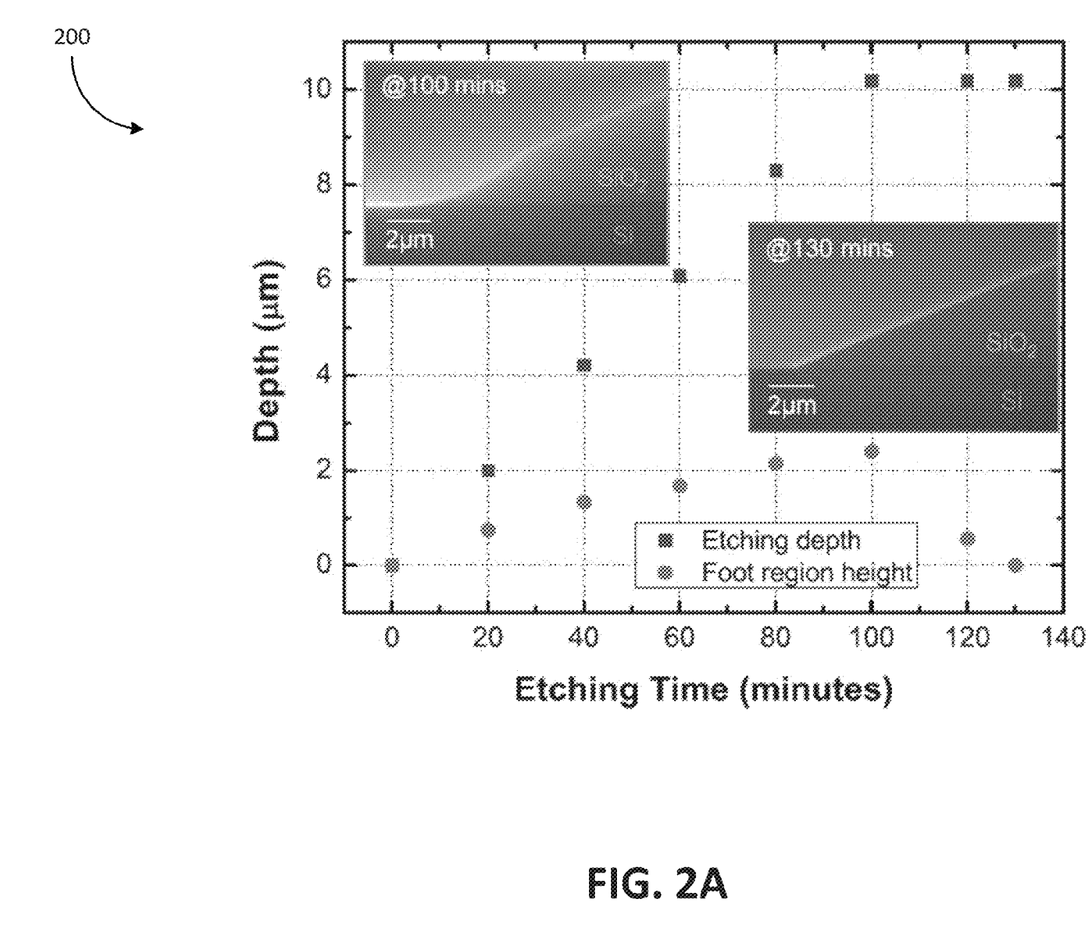
FIG. 2A shows a graph that shows the effect of etching time when a 10 um thick silicon assembly is etched in accordance with the invention.

FIG. 2A shows a graph 200 that shows the effect of etching time on appearance of the foot region during etching. In this particular example, the silica layer has a thickness of about 10 micron. As can be understood, extending the etching time from 100 minutes (where the foot region is present) to 130 minutes eliminates the foot region and produces a smooth (linear) sloping surface.

Figure 2B:
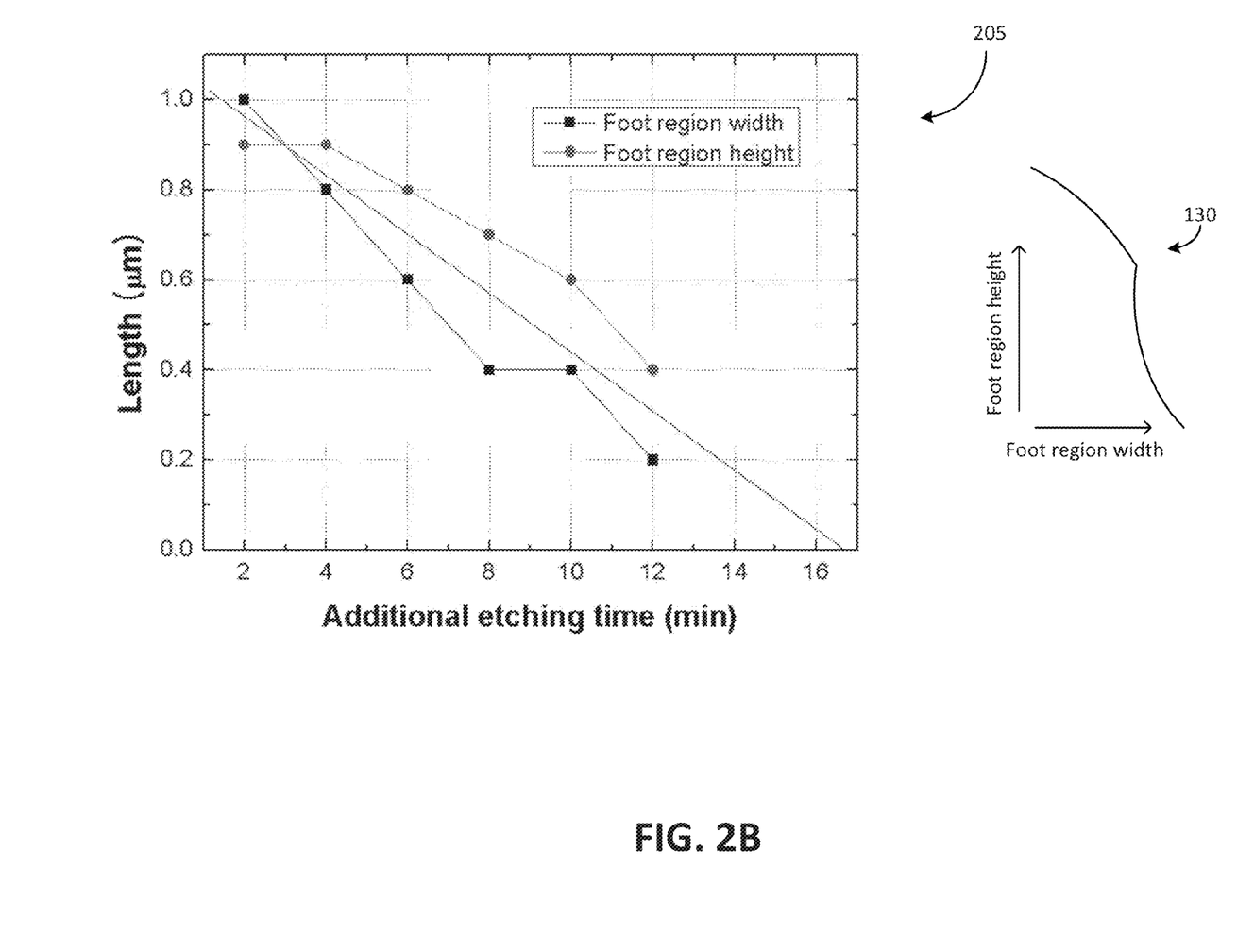
FIG. 2B shows a graph that provides some information pertaining to an additional etching time that is used to eliminate a foot region when a 2 um thick silicon assembly is etched, in accordance with the invention.

FIG. 2B shows a graph 205 that provides some additional information pertaining to the extended etching time. As can be observed from the graph, the extended etching time may be varied in part, based on the height and/or the width of the foot region, with a greater period of time being used to etch excess material when the foot width and/or height is larger.

FIG. 3 shows several cross-sectional views associated with a circular wedge resonator 150 to illustrate the effects of slope angles on light propagation through a waveguide portion of the resonator. View 360 provides a top view of circular wedge resonator 150. In this top view, area 305 corresponds to the support pillar seen through the silicon dioxide wedge structure 135, which is transparent as a result of the silicon dioxide material (which is basically, glass). The area 310 corresponds to the top surface of wedge structure 135, area 315 to the bottom surface of wedge structure 135 and area 320 corresponds to the silicon substrate 105. The concentric, non-overlapping area between circular areas 310 and 315 corresponds to the sloping surface of circular wedge resonator 150.

Various configurations of this sloping surface will now be described in order to highlight the effects of slope angle 125 (in waveguide 150) upon photonic propagation through wedge structure 135 of circular wedge resonator 150.

When slope angle 125 is relatively acute (less than 27 degrees, typically around 7 degrees) as shown in embodiment 365, a distorted mode profile 340 is created during a fundamental TE mode of photonic propagation.

When slope angle 125 is greater, not only does mode profile 340 suffer less mode compression, but the widths of surfaces 310 and 315 may be made smaller in width than those of embodiment 365.

When slope angle 125 approaches 90 degrees, mode profile 340 suffers reduced mode compression and the widths of surfaces 310 and 315 become more optimally minimal. Consequently, in certain embodiments in accordance with the invention it is preferable to incorporate slope angles ranging from about 60 degrees to about 90 degrees. However, in certain other embodiments, it may be preferable for various other reasons, to incorporate slope angles down to around 7 degrees. Some advantages associated with using reduced widths of surfaces 310 and 315 will become more apparent from the description below of FIG. 6.

Figure 4:
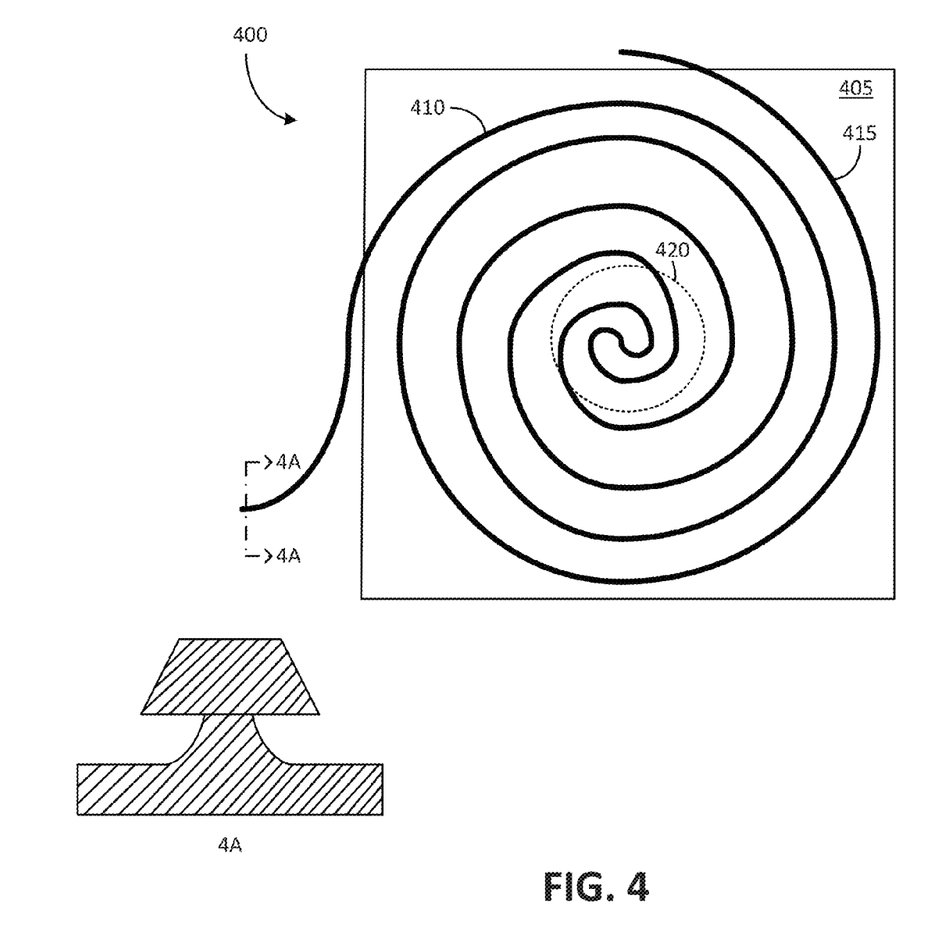
FIG. 4 shows a whispering-gallery-mode waveguide configured in a spiral structure in accordance with one embodiment of the invention.

FIG. 4 shows a whispering-gallery-mode waveguide 400 configured in a spiral structure in accordance with one embodiment of the invention. Waveguide 400, which has a cross-sectional profile (shown by sectional view 4A-4A) similar to that of circular wedge resonator 150 described above, is fabricated on substrate 405 that may be a part of a silicon-based integrated circuit. Waveguide 400 may be used as a non-resonant ultra-low-loss optical delay line.

Waveguide 400 includes a first spiral 410 and a second spiral 415. First spiral 410 couples light from the exterior to the interior of the structure. Second spiral 415 returns the light to the exterior. The spiral structure incorporates a curvature (also known as whispering gallery guidance) that provides optical confinement inside waveguide 400.

Optical coupling may be provided into either one of the first or the second spirals, either of which may be used due to the directionally-independent nature of light propagation in waveguide 400. The optical coupling may be provided via, fiber tapers, end-fire coupling, or integrated adiabatic couplers for example. Although not shown in FIG. 4, waveguide 400 can also be coupled to conventional waveguides, since the spiral structure itself is lithographically designed.

A loopback coupler portion 420 is provided at the center of the spiral structure. Loopback coupler portion 420 is operative to redirect light travelling in a first direction in one spiral (first spiral, for example) into the second spiral (second spiral, for example) wherein the light travels in an opposite direction. It will be understood that the waveguide properties of waveguide 400 is mode-agnostic. Thus, in one embodiment, wherein light injected into waveguide 400 is multi-mode light, waveguide 400 propagates the light without modifying the mode and furthermore, the insertion loss of loopback coupler portion 420 upon this multi-mode light is less than 0.5 dB. In another embodiment, wherein the injected light is single-mode light, waveguide 400 propagates the light without modifying the mode and furthermore, the insertion loss of loopback coupler portion 420 upon this single-mode light is less than 0.03 dB.

Waveguide 400 provides several advantages over prior art waveguides, including waveguides incorporating a wedge structure having a cross-sectional shape somewhat similar to that of the wedge structure incorporated into waveguide 400.

Firstly, though somewhat similar in cross-sectional shape, as mentioned above, in many instances, prior art waveguides were expressly designed to obtain slope angles less than 27 degrees. However, this small slope angle not only creates optical loss (due to dissipation, mode compression, absorption etc.), but also extends the cross-sectional width of the waveguide (as described above using FIG. 3) thereby placing limitations on a pitch factor of the spiral, which in turn places limitations on the overall length achievable for the spiral structure on a given substrate area. In other words, a diameter-to-propagation-length ratio of waveguide 400 is larger than that offered by prior art solutions, as a result of the greater slope angle (greater than 27 degrees, to about 90 degrees).

In the context of achievable overall length, waveguide 400, in one exemplary embodiment as depicted in FIG. 4, provides an optical propagation length of about 7 meters on a silicon wafer that is approximately 5 cm×5 cm in area.

Figure 5:
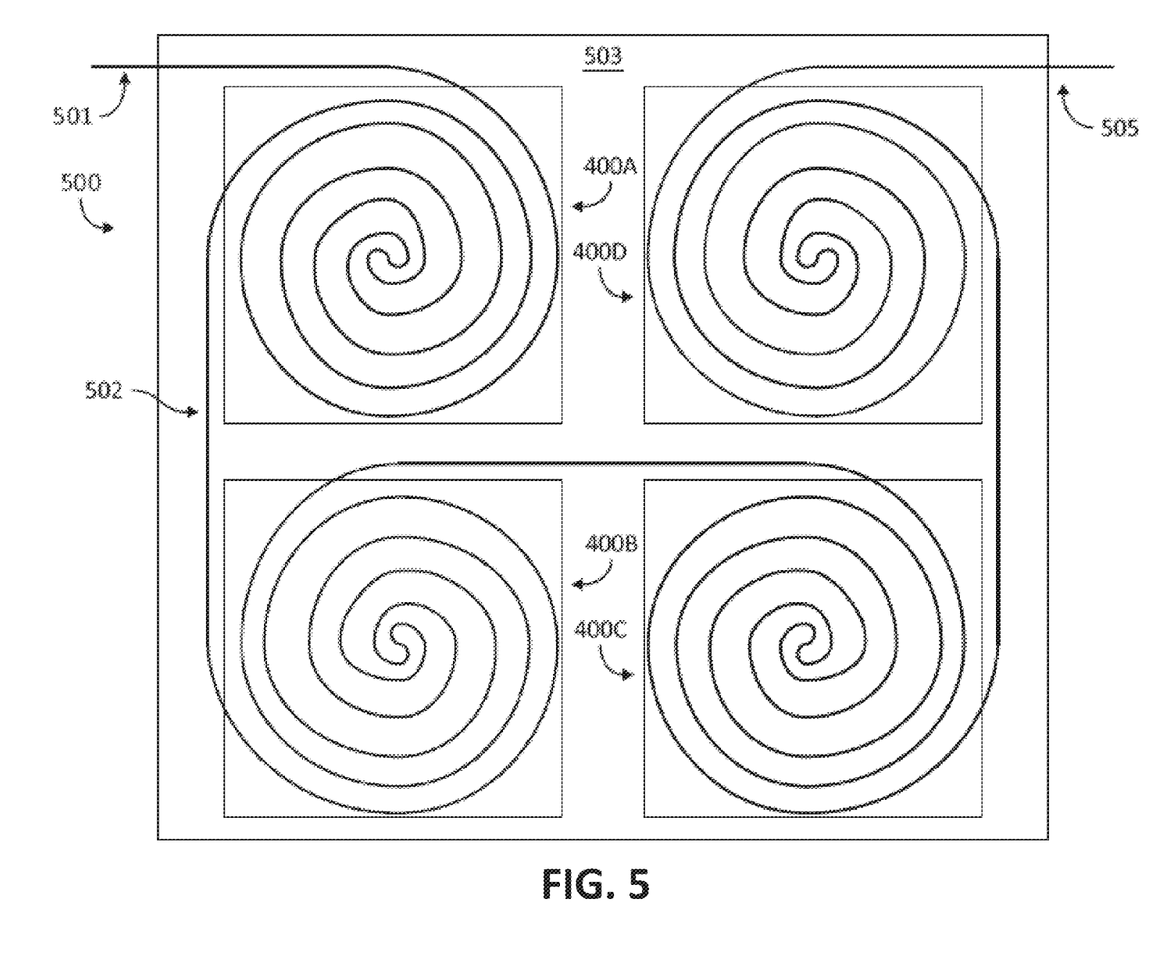
FIG. 5 shows an exemplary configuration wherein four spiral structures are coupled together to form a concatenated whispering-gallery-mode waveguide in accordance with another embodiment of the invention.

FIG. 5 shows an exemplary configuration wherein four spiral structures are coupled together to form a concatenated whispering-gallery-mode waveguide 500 on substrate 503 in accordance with another embodiment of the invention. Light may be coupled into waveguide 500 via a coupler (not shown) at waveguide portion 501 (or alternatively at waveguide portion 505). The coupled light propagates through a first spiral waveguide 400A and exits via waveguide portion 502 that couples the exiting light into second spiral waveguide 400B. The light then propagates through spiral waveguides 400C and 400D, as shown, before exiting out of concatenated whispering-gallery-mode waveguide 500 via waveguide portion 505.

Figure 6:
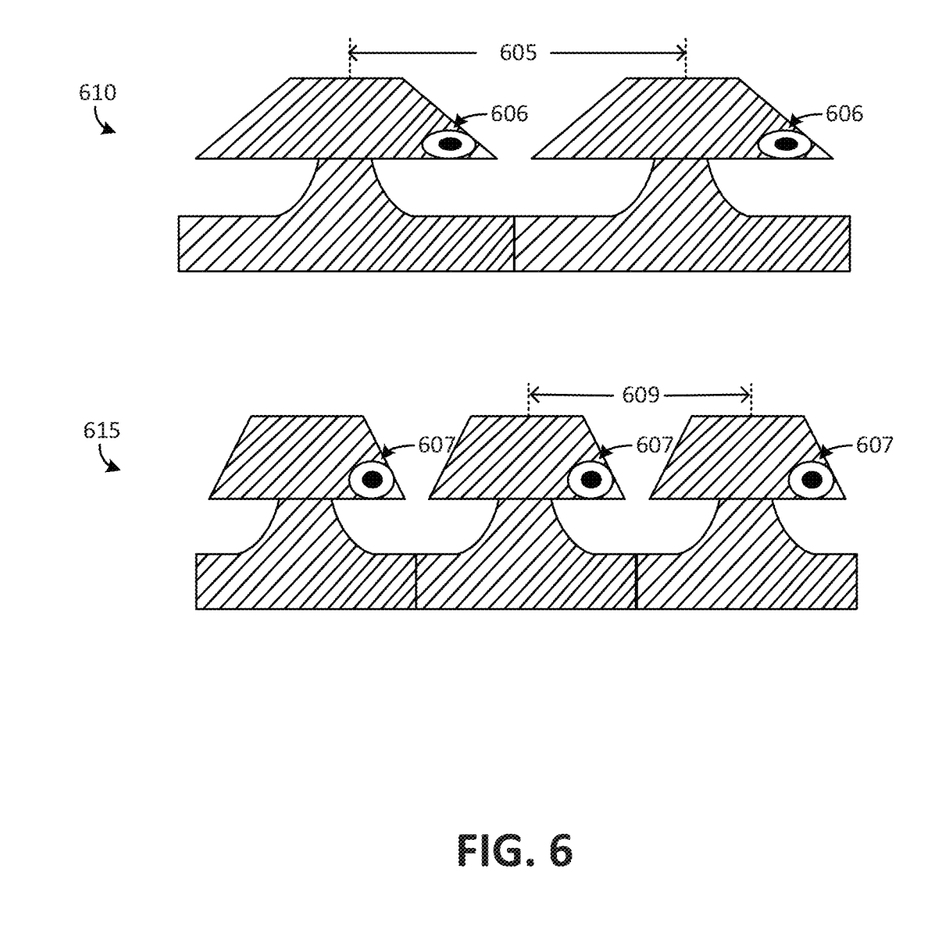
FIG. 6 shows several cross-sectional views of various whispering-gallery-mode waveguides to illustrate the effects of various slope angles on spacing between adjacent waveguide channels.

FIG. 6 shows several cross-sectional views of various whispering-gallery-mode waveguides to illustrate the effects of various slope angles on spacing between adjacent waveguide channels.

Waveguide 610 is viewed herein as a prior art waveguide having a slope angle that is less than 27 degrees. This acute slope angle not only creates a compressed mode profile 606 during photonic propagation through the wedge portion of the waveguide, but also results in a relatively large pitch 605, wherein pitch (or pitch factor) may be interpreted as inter-channel spacing between, for example, first spiral 410 and second spiral 415 of waveguide 400 shown in FIG. 4.

Waveguide 615, which in accordance with one embodiment of the invention, has a slope angle greater than 27 (but less than 90 degrees) thereby resulting in a relatively less distorted mode profile 607 and also a reduced pitch 609, which is significantly smaller than pitch 605. The reduced pitch 609 permits closer spacing between adjacent waveguide channels, which in turn permits an overall length increase in waveguide 615 that can be fabricated on the same substrate area as used for fabricating waveguide 610. The overall length increase may be better understood by viewing waveguide 400 of FIG. 4 as having a spiral structure wherein the spacing between first spiral 410 and second spiral 415 is reduced thereby increasing the number of spiral swirls in the spiral structure and consequently, the propagation length between the entry point and the exit point for light in waveguide 400.

The description above that is made with reference to various figures illustrates certain aspects of the invention. Additional description provided below provides further insights into certain benefits and features.

Prior art approaches have taken into consideration the Q factor in a wedge-shaped resonator device fabricated of silica on a silicon wafer. [6]. Q factors as high as 50 million were obtained in these prior art approaches, which primarily focused on reducing optical loss by isolating the propagation mode from the lithographic blemishes near the outer rim of the resonator by using a shallow wedge angle. In contrast to the Q values obtained in the prior art solutions, the approach described herein results in an optical Q that is boosted by a factor of 15× beyond the earlier achieved values. An exemplary Q factor of 875 million has been achieved using various embodiments described herein. This Q factor corresponds to an equivalent waveguide loss of 0.03 dB/m.

While the devices in accordance with the invention may resemble the earlier geometry to some extent, these new devices derive ultra-high Q performance from overall changes to the etch process and the oxide growth. Specifically, the physical principle at work in the earlier structures, a shallow wedge angle to provide roughness isolation, is no longer required. Indeed, and in contrast to earlier work, larger wedge angles are desirable. For example, these larger wedge angles can range from 27 degrees to 90 degrees as described herein.

The ability to lithographically define ultra-high Q resonators as opposed to relying upon the reflow process enables a multi-order-of-magnitude improvement in control of resonator diameter and free-spectral-range (FSR). For example, an FSR of about 8.75 GHz may be obtained in a 7.5 mm diameter resonator by using a 0.45 MHz variation (1:20,000 range).

A study of the effect of diameter on Q factor indicates that larger diameter devices have a smaller field amplitude at the dielectric interface, thereby reducing the detrimental impact of surface scattering. Wedge resonators may provide certain benefits such as for example, in nonlinear laser sources where threshold varies inverse quadratically with Q factor. They will also lend themselves to applications where mode volume is not a significant parameter, and rather where microwave-rate free spectral range is important, such as in frequency microcombs.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the waveguides of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] K. J. Vahala, "Optical microcavities", Nature, 424, 839-846 (2003)

[2] T. J. Kippenberg, R. Holzwarth and S. A. Diddams, "Microresonator-based optical frequency combs," Science, 332, 555-559 (2011)

[3] F. Vollmer and S. Arnold, "Whispering-gallery-mode biosensing: label-free detection down to single molecules," Nature Methods, 5. 591-596 (2008)

[4] T. Lu, H. Lee, T. Chen, S. Herchak, J. Kim, S. E. Fraser, R. C. Flagan and K. J. Vahala, "High sensitivity nanoparticle detection using optical microcavities," Proc Natl Acad Sci, 108(15), 5976-5979, (2011)

[5] D. K. Armani, T. J. Kippenberg, S.M. Spillane and K. J. Vahala, "Uitra-high-Q toroid microcavity on a chip," Nature, 421, 925-929 (2003)

[6] T. J. Kippenberg, J. Kalkman, A. Polman and K. J. Vahala, "Demonstration of an erbium-doped microdisk laser on a silicon chip," Physical Review A, 74, 051802 (2006).

[7] R. Adar, M. Serbin, and Y. Mizrahi, "Less than I dB per meter propagation loss of silica waveguides measured using a ring resonator," J. of Light. Tech. 12, 1369-1372 (1994).

[8] T. Kominato, Y. Hida, M. ltoh, H. Takahashi, S. Sohma, T. Kitoh, and Y. Hibino, "Extremely low-loss (0.3 dB/m) and long silica-based waveguides with large width and clothoid curve connection," in Proceedings of ECOC (Stockholm, Sweden, 2004).

[9] J. F. Bauters, M. J. R. Heck, D. John, D. Dai, M. Tien, J. S. Barton, A. Leinse, R. G. Heideman, D. J. Blumenthal, and J. E. Bowers. "Ultra-low-loss high-aspect-ratio $Si_3N_4$ waveguides," Optics Express, 19, 3163-3174 (2011).

[10] T. J. Kippenberg, J. Kalkman, A. Polman, and K. J. Vahala,"Demonstration of an erbium-doped microdisk laser on a silicon chip." Physical Review A, 74, 051802 (2006).

[11] Vahala, K. J. Optical microcavities. Nature 424, 839-846 (2003).

[12] Kippenberg, T. J. & Vahala, K. J. Cavity optomechanics: Back-action at the mesoscale. Science 321, 1172-1176 (2008).

[13] Kippenberg, T. J. & Vahala, K. J. Cavity opto-mechanics. Optics Express 15, 17172-17205 (2007).

[14] Matsko, A. B. & Ilchenko, V. S. Optical resonators with whispering-gallery modes-part I: basics. IEEE J. Sel. Top. Quant. Electron. 12, 3-14 (2006).

[15] Ilchenko, V. S. & Matsko, A. B. Optical resonators with whispering-gallery modes-part II: applications. IEEE J. Sel. Top. Quant. Electron. 12, 15-32 (2006).

[16] Kippenberg, T. J., Holzwarth, R. & Diddams, S. A. Microresonator-based optical frequency combs. Science 332, 555-559 (2011).

[17] Aoki, T. et al. Observation of strong coupling between one atom and a monolithic microresonator. Nature 442, 671-674 (2006).

[18] Armani, D. K., Kippenberg, T. J., Spillane, S. M. & Vahala, K. J. Ultra-high-Q toroid microcavity on a chip. Nature 421, 925-929 (2003).

[19] Grudinin, I. S., Matsko, A. B. & Maleki, L. On the fundamental limits of Q factor of crystalline dielectric resonators. Optics Express 15, 3390-3395 (2007).

[20] Grudinin, I. S., Ilchenko, V. S. & Maleki, L. Ultrahigh optical Q factors of crystalline resonators in the linear regime. Phys. Rev. A 74, 063806 (2006).

[21] Savchenkov, A. A., Matsko, A. B., Ilchenko, V. S. & Maleki, L. Optical resonators with ten million finesse. Optics Express 15, 6768-6773 (2007).

[22] Tomes, M. & Carmon, T. Photonic microelectromechanical systems vibrating at X-band (11-GHz) rates. Phys. Rev. Lett. 102, 113601 (2009).

[23] Grudinin, I. S., Yu, N. & Maleki, L. Brillouin lasing with a CaF2 whispering gallery mode resonator. Phys. Rev. Lett. 102, 043902 (2009).

[24] Pant, R. et al. Cavity enhanced stimulated Brillouin scattering in an optical chip for multiorder Stokes generation. Optics Letters 36, 3687-3689 (2011).

[25] Kippenberg, T. J., Kalkman, J., Polman, A. & Vahala, K. J. Demonstration of an erbium-doped microdisk laser on a silicon chip. Phys. Rev. A 74, 051802 (2006).

[26] Cai, M., Painter, O. J. & Vahala, K. J. Observation of critical coupling in a fiber taper to silica-microsphere whispering gallery mode system. Phys. Rev. Lett. 74, 051802 (2006).

[27] Spillane, S. M., Kippenberg, T. J., Painter, O. J. & Vahala, K. J. Ideality in a fiber-taper-coupled microresonator system for application to cavity quantum electrodynamics. Phys. Rev. Lett. 91, 043902 (2003).

[28] Vernooy, D. W., Ilchenko, V. S., Mabuchi, H., Streed, E. W. & Kimble, H. J. High-Q measurements of fusedsilica microspheres in the near infrared. Optics Letters 23, 247-249 (1998).

[29] Smith, S. P., Zarinetchi, F. & Ezekiel, S. Narrow-linewidth stimulated brillouin fiber laser and applications. Optics Letters 16, 393-395 (1991).

[30] Okawachi, Y. et al. Tunable all-optical delays via brillouin slow light in an optical fiber. Phys. Rev. Lett. 94, 153902 (2005).

[31] Zhu, Z., Dawes, A., Gauthier, D., Zhang, L. & Willner, A. Broadband SBS slow light in an optical fiber. Journal of Lightwave Technology 25, 201-206 (2007).

[32] Zhu, Z., Gauthier, D. & Boyd, R. Stored light in an optical fiber via stimulated brillouin scattering. Science 318, 1748-1750 (2007).

[33] H"ansch, T. & Couillaud, B. Laser frequency stabilization by polarization spectroscopy of a reflecting reference cavity. Opt. Commun. 35, 441-444 (1980).

[34] Schliesser, A., Riviere, R., Anetsberger, G., Arcizet, O. & Kippenberg, T. J. Resolved-sideband cooling of a micromechanical oscillator. Nature Physics 4, 415-419 (2008).

[35] Tkach, R. W., Chraplyvy, A. R. & Derosier, R. M. Spontaneous Brillouin scattering for single-mode optical-fibre characterisation. Electron. Lett. 22, 1011-1013 (1986).

[36] Del'Haye, P., Arcizet, 0., Schliesser, A., Holzwarth, R. & Kippenberg, T. J. Full stabilization of a microresonator frequency comb. Phys. Rev. Lett. 101, 053903 (2008).

[37] Kippenberg, T. J., Spillane, S. M. & Vahala, K. J. Kerr-nonlinearity optical parametric oscillation in an ultra-high-Q toroid microcavity. Phys. Rev. Lett. 93, 083904 (2004).

[38] Ciminelli, C., Dell'Olio, F., Campanella, C. & Armenise, M. Photonic technologies for angular velocity sensing. Adv. Opt. Photon. 2, 370-404 (2010).

[39] Matsko, A. B., Savchenkov, A. A., Yu, N. & Maleki, L. Whispering-gallery-mode resonators as frequency references. I. fundamental limitations. J. Opt. Soc. Am. B 24, 1324-1335 (2007).

[40] Savchenkov, A. A., Matsko, A. B., Ilchenko, V. S., Yu, N. & Maleki, L. Whispering-gallery-mode resonators as frequency references. II. stabilization. J. Opt. Soc. Am. B 24, 2988-2997 (2007).

[41] Gorodetsky, M. L. & Grudinin, I. S. Fundamental thermal fluctuations in microspheres. J. Opt. Soc. Am. B 21, 697-705 (2004).

[42] Anetsberger, G., Riviere, R., Schliesser A., Arcizet, 0. & Kippenberg T. J., Ultralow-dissipation optomechanical resonators on a chip. Nature Photonics 2, 627-633 (2011).

[43] Tien, M. C. et al. Ultra-high quality factor planar Si3N4 ring resonators on Si substrates. Optics Express 19, 13551-13556 (2011).

[44] Ciminelli, C., Passaro, V., Dell'Olio, F. & Armenise, M. Three-dimensional modelling of scattering loss in In-GaAsP/InP and silica-on-silicon bent waveguides. J. Eur. Opt. Soc. Rapid Publ. 4, 1-6 (2009).

[45] Barwicz, T. & Haus, H. Three-dimensional analysis of scattering losses due to sidewall roughness in microphotonic waveguides. J. Lightwave Technol. 23, 2719-2732 (2005).

[46] Payne, F. & Lacey, J. A theoretical analysis of scattering loss from planar optical waveguides. Opt. Quantum. Electron. 26, 977-986 (1994).

What is claimed is:

1. A method for fabricating a waveguide, comprising:
placing a silicon substrate in a furnace;
introducing steam into the furnace;
raising a temperature inside the furnace to a first temperature level wherein a silicon dioxide layer is formed on a major surface of the silicon substrate;
eliminating a moisture content in the silicon substrate by heating the silicon substrate at a second temperature level in an oxygen-rich environment;
forming a first assembly by applying a photo-resist layer upon a portion of the major surface of the silicon dioxide layer;

immersing the first assembly into a bath containing an etching solution selected for etching silicon dioxide;

forming a second assembly by allowing the etching solution to act upon the silicon dioxide layer of the first assembly for a first period of time that is selected in order to: a) expose a portion of the silicon substrate, and b) form a wedge structure in the silicon dioxide layer;

forming a third assembly by extending the first period of time by a second period of time in order to eliminate a foot region formed upon a sloping surface of the wedge structure;

after eliminating the foot region, forming a fourth assembly by removing the photo-resist layer from the third assembly; and forming a waveguide component from the fourth assembly by exposing the fourth assembly to a xenon difluoride ($XeF_2$) environment that eliminates a portion of the silicon substrate and forms a support pillar below the wedge structure.

2. The method of claim 1, wherein the first period of time is further selected to allow the etching solution to act upon the silicon dioxide layer to form a slope angle ranging from about 7 degrees to about 90 degrees in the sloping surface of the wedge structure.

3. The method of claim 2, wherein an adhesion promoter is incorporated into the photo-resist layer, the adhesion promoter providing an adhesion factor between the photo-resist layer and the silicon dioxide layer, the adhesion factor selected in accordance with the first period of time and the slope angle.

4. The method of claim 3, wherein eliminating the moisture content in the silicon substrate comprises heating the silicon substrate at about 1000 degrees Celsius for about 24 hours in an oxygen-rich environment.

5. The method of claim 4, wherein the etching solution is a buffered hydrofluoric solution.

6. The method of claim 4, wherein the wedge structure after elimination of the moisture content has a trapezoidal cross-section with the sloping surface forming one leg of the trapezoidal cross-section.

7. The method of claim 4, wherein the waveguide component is formed as a wedge microcavity having a substantially circular shape with a diameter exceeding 500 microns.

8. The method of claim 7, wherein the wedge microcavity is formed as a whispering-gallery-mode waveguide.

9. The method of claim 8, wherein the whispering-gallery-mode waveguide is formed as a spiral structure.

10. The method of claim 9, wherein a diameter-to-propagation-length ratio of the spiral structure is determined, at least in part, by the slope angle, with a greater slope angle providing a smaller diameter-to-propagation-length ratio.

11. The method of claim 9, wherein the spiral structure comprises:
a first spiral waveguide;
a second spiral waveguide interspersed with the first spiral waveguide; and
a loopback coupler portion configured to couple the first spiral waveguide to the second spiral waveguide in a configuration that accommodates propagation of light in the first spiral waveguide in a first direction, a directional reversal in the loopback coupler portion, and propagation of the light in the second spiral waveguide in an opposite direction.

12. The method of claim 11, further comprising:
fabricating the spiral structure to provide an overall propagation length of about 7 meters on a silicon wafer that is approximately 5 cm×5 cm is area.

13. A waveguide comprising:
a wedge structure formed from a silicon dioxide layer, in part by eliminating a foot region, the wedge structure having a linear sloping surface with a linear slope angle ranging from >7 degrees to 90 degrees, the linear sloping surface further characterized by an absence of the foot region;
wherein the waveguide is configured as a whispering-gallery-mode microcavity.

14. The waveguide of claim 13, wherein the waveguide is configured as a wedge microcavity having a substantially circular shape with a diameter exceeding 500 microns.

15. The waveguide of claim 14, wherein the wedge microcavity further includes a support pillar formed on a silicon substrate, the wedge structure supported upon the silicon substrate by the support pillar.

16. The waveguide of claim 13, wherein the wedge structure is incorporated into a first waveguide sub-assembly, the first waveguide sub-assembly comprising:
a first spiral waveguide;
a second spiral waveguide interspersed with the first spiral waveguide; and
a loopback coupler portion configured to couple the first spiral waveguide to the second spiral waveguide in a configuration that accommodates propagation of light in the first spiral waveguide in a first direction, a directional reversal in the loopback coupler portion, and propagation of the light in the second spiral waveguide in an opposite direction.

17. The waveguide of claim 16, wherein a waveguide length of the first waveguide sub-assembly is about 7 meters, and a mounting area of a silicon substrate upon which the first waveguide sub-assembly is located is about 5 cm×5 cm.

18. The waveguide of claim 16, wherein the wedge structure is incorporated into a second waveguide sub-assembly constructed substantially similar to the first waveguide sub-assembly, the first and second waveguide sub-assemblies coupled in a series arrangement for obtaining a delay line having an extended waveguide length.

19. The waveguide of claim 18, further including a third waveguide sub-assembly and a fourth waveguide sub-assembly each of which is constructed substantially similar to the first waveguide sub-assembly, the first, second, third and fourth waveguide sub-assemblies coupled in a series arrangement for further extending the waveguide length of the delay line.

20. The waveguide of claim 19, wherein each of the first, second, third and fourth waveguide sub-assemblies is located in a respective quadrant of a silicon substrate.

21. The waveguide of claim 20, wherein the waveguide length of the serially-coupled first, second, third and fourth waveguide sub-assemblies is about 27 meters, and a cumulative footprint area of the first, second, third and fourth waveguide sub-assemblies is about 100 $cm^2$.

* * * * *